United States Patent [19]

Garuglieri

[11] Patent Number: 5,513,548

[45] Date of Patent: May 7, 1996

[54] CHOP/TABLE SAW WITH PARALLELOGRAM ARRANGEMENT

[75] Inventor: Andrea Garuglieri, Colle Brianza, Italy

[73] Assignee: Black & Decker Inc., Newark, Del.

[21] Appl. No.: 272,716

[22] Filed: Jul. 8, 1994

[30] Foreign Application Priority Data

Jul. 8, 1993 [GB] United Kingdom .................. 9314165

[51] Int. Cl.$^6$ ...................................................... B27B 5/20

[52] U.S. Cl. ......................... 83/397; 83/477.1; 83/477.2; 83/589; 83/490

[58] Field of Search ........................ 83/490, 397, 471.3, 83/477.1, 477.2, 589

[56] References Cited

U.S. PATENT DOCUMENTS

| | | | |
|---|---|---|---|
| 2,320,743 | 6/1943 | Nilsen et al. | 83/397 |
| 2,851,068 | 9/1958 | Goodlet | 83/490 |
| 3,011,529 | 9/1959 | Copp . | |
| 3,570,564 | 3/1971 | Bergler | 83/471.3 |
| 4,531,441 | 7/1985 | Bergler | 83/477.2 |
| 5,189,937 | 3/1993 | Garuglieri | 83/471.3 |

FOREIGN PATENT DOCUMENTS

| | | |
|---|---|---|
| 0450408 | 3/1991 | European Pat. Off. . |
| 0450400 | 3/1991 | European Pat. Off. . |
| 0502350 | 2/1992 | European Pat. Off. . |
| 1628992 | 1/1968 | Germany . |

*Primary Examiner*—Kenneth E. Peterson
*Attorney, Agent, or Firm*—Charles E. Yocum; Dennis A. Dearing; Frederick H. Voss

[57] ABSTRACT

A saw (10) comprises a frame, a table (12) mounted in the frame and adapted to adopt two positions. A pivot member (14) is on a first side of the table and a saw assembly (16) is pivoted (at 18) to the pivot member. A blade (26) is journalled in the assembly and a motor (22) drives the blade. An upper guard (32) covers an upper portion of the blade and is pivoted to the assembly, while a lower guard (40) covers a lower portion of the blade. A slot in the table permits the blade to protrude through the table.

In a first of said two positions of the table, the saw assembly is above the table and the saw is a chop saw for performing plunge cuts on workpieces supported on said first side of the table (FIG. 1). In a second of said two positions, the saw assembly is below the table and the saw is a bench saw for performing cuts on workpieces passed through the blade on a second opposite side of the table (FIG. 2). A parallelogram lever (34) has a pivotal connection to the pivot member (at 38) and upper guard (at 36) whereby the orientation of the upper guard to the table is maintained. An extension (118) of the parallelogram lever has a rack (150) which, in bench saw mode, engages a worm gear (152) turnable by a knob to effect an adjustment to the depth of cut of the blade.

11 Claims, 7 Drawing Sheets

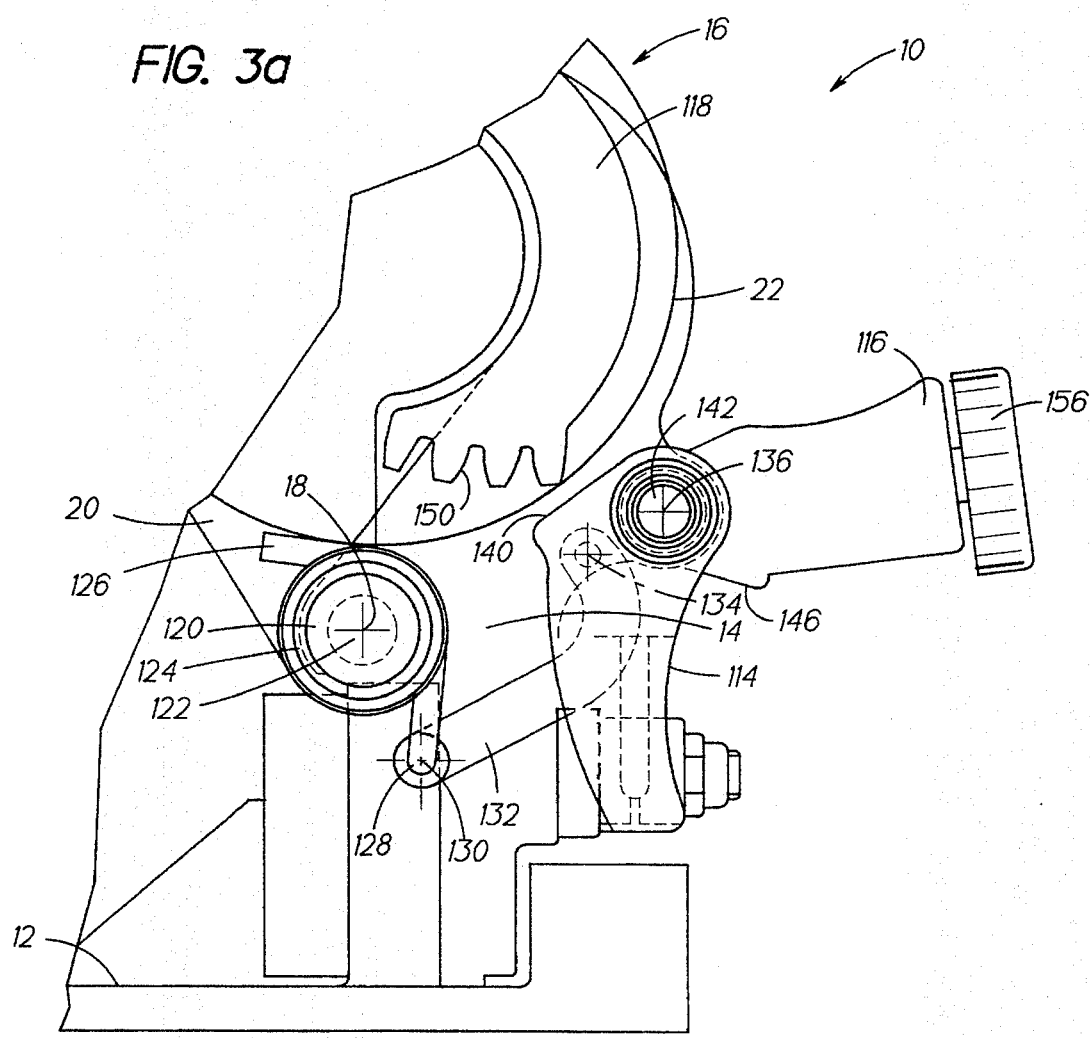

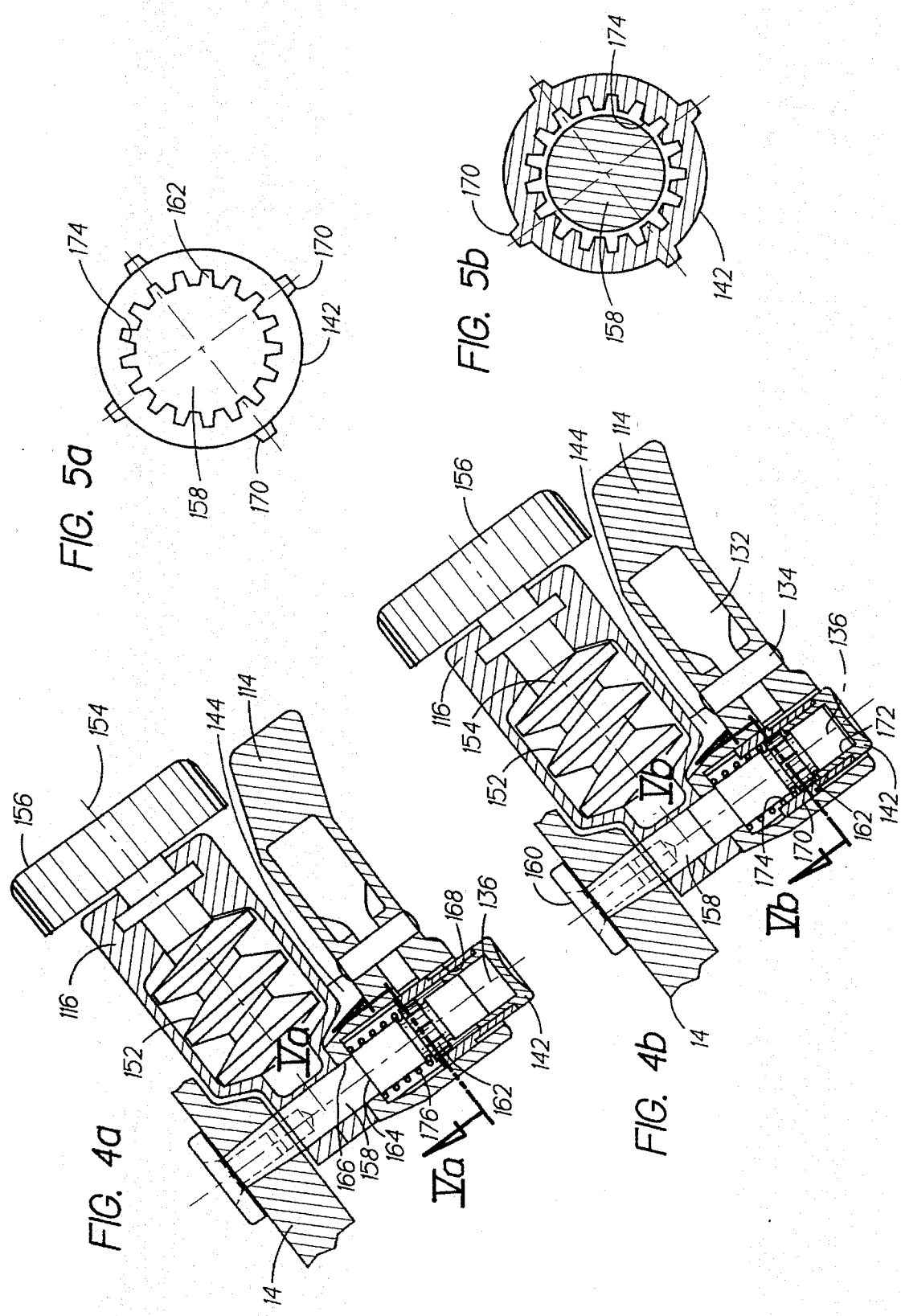

CHOP/TABLE SAW WITH PARALLELOGRAM ARRANGEMENT

BACKGROUND OF THE INVENTION

This invention relates to circular saws of the type comprising a table, a pivot member on tile table and a saw assembly pivoted about a pivot axis with respect to said pivot member, whereby said saw assembly carrying a motor driven blade can be plunged into a workpiece supported on the table.

Such saws are known and described in published patent documents such as EP 0133666 and EP 0450400. These saws are useful and have numerous possibilities for enhancement to improve the capacity, capability and efficiency, not to mention cleanliness and safety of their arrangements. On the other hand, all these features add complexity and cost, and may render the saw user unfriendly.

The present invention particularly relates to saws of the type described above but which in addition have the table mounted in a frame such that the table may be inverted, as by pivoting about an axis, so that the saw assembly is then beneath the table. The table is in addition provided with a slot so that the blade call protrude through the slot to render tile saw a bench or table saw. Such saws are shown and described in DE 1628992 and EP 0502350.

Both EP 0133666 and EP 0450400 mentioned above describe saws in which the saw assembly comprises an upper guard and a lower guard for the blade. The upper guard is formed from the housing of the assembly and permanently covers a top part of the blade. A bottom part of the blade is covered by the lower guard but this must be withdrawn in use so that the blade is exposed when required to perform cutting operations.

A handle is disposed on the upper guard by means of which a user can pivot the saw assembly up and down to perform cutting operations on a workpiece supported on the table.

The lower guard may be opened entirely by an actuating lever disposed on said handle. Alternatively the guard may be opened automatically by pivoting of the saw assembly, there being provided a connection between the guard and the pivot member for this purpose. A further alternative is that the guard may be opened partly by either of these arrangements and only further opened by direct contact with a workpiece.

Although not explicitly described in EP 0450400, the saw to which that specification relates employs a parallelogram lever arrangement. The upper guard is pivoted with respect to the saw assembly. A parallelogram lever extends between the upper guard and the pivot member and lies parallel a line joining the pivot axis of the guard to the assembly and the pivot axis of the assembly to the pivot member. This arrangement serves to maintain the orientation of the upper guard with respect to the pivot member and hence to the table. Apart from a minor benefit when in the chop saw mode the primary benefit is provided when the saw is in its bench saw mode. This is because a riving knife is attached to the upper guard when the saw is in bench saw mode and it is important that the tip of the riving knife is almost level with the top of the saw blade. It needs to be above the blade where the workpiece being cut is to be entirely separated, and in which case a guard is usually mounted on the knife above the level of the blade, or just below the level of the blade when so-called pocket cuts are made, that is to say, grooves are cut in the workpiece. In any event, the orientation of the knife with respect to the blade should remain constant for all positions of the blade and it is for this reason that a parallelogram arrangement is frequently employed.

It is of course necessary in bench saw mode of the saw to provide for different positions of the blade with respect to the table, that is to say, the extent to which it protrudes through the slot in the table and hence the depth of cut of the blade. It is well known that the blade should protrude through the slot only sufficiently to leave a small amount of blade above the workpiece (assuming complete separation of the workpiece is required) so that the maximum number of teeth on the blade are in contact with the workpiece at any one time. For pocket cuts, a more precise adjustment of the depth of cut is required.

SUMMARY OF THE INVENTION

It is an object of the present invention to provide a convenient means of adjusting the depth of cut of a saw of the types described above.

In accordance with this invention there is provided a saw comprising a frame, a table mounted in the frame and adapted to adopt two positions, a pivot member on a first side of the table, a saw assembly pivoted with respect to the pivot member, a blade journalled in said assembly, a motor to drive the blade, an upper guard to cover an upper portion of the blade, which upper guard is pivoted to said assembly, a slot in the table through which said blade is adapted to protrude, in a first of said two positions of the table the saw assembly being above the table, the saw thereby forming a chop saw for performing plunge cuts on workpieces supported on said first side of the table, and, in a second of said two positions of the table, the saw assembly being below the table and the saw thereby forming a bench saw for performing cuts on workpieces passed through the blade on a second opposite side of the table, a parallelogram lever having a pivotal connection to the pivot member ad upper guard whereby the orientation of said upper guard with respect to said pivot member is maintained, and an extension of said parallelogram lever which, when the saw assembly is in its second position, is adapted to co-operate with said pivot member through an adjustment means so that the position of said saw assembly with respect to the pivot member is controlled by said adjustment memos.

Thus the parallelogram lever has here a dual function of maintaining the orientation of the upper guard with respect to pivot member, and hence the table, and, when in bench saw mode, to control the depth of cut of the blade because its ova movement is controlled by the adjustment means.

Preferably the adjustment means comprises a worm gear rotationally mounted in a carrier member, which carrier member is adjustably connected, preferably pivoted, to said pivot member, and said extension has a rack to engage said worm gear, rotation of the worm gear when engaged with said rack serving to pivot said parallelogram lever about its pivot to the pivot member to alter the depth of protrusion of the blade through the slot.

Means must be provided in all reasonable circumstances to bias the saw assembly to a raised, upright position when it is at rest in chop saw mode so that the user is not required to lift the not insignificant weight of the saw assembly after completing a plunge cut. Such means is normally in the form of a powerful spring.

However, a problem arises when the table is flipped-over to convert the saw into a bench saw. Now the weight of the saw assembly acts in the opposite direction with respect to the table, whereas the spring or other biasing memos usually acts in the stone sense. Moreover, in the bench saw mode, the saw assembly (before the table is flipped-over) is plunged into the table so that the blade protrudes right through the slot. This serves to tension the spring even more and further exacerbates a problem found with depth of cut adjustments. That is to say, not only must the adjustment means be able to accommodate the weight of the saw assembly, but it must also cope with the extra force imparted by the spring means, which now acts in the same direction as the weight of the saw assembly.

The adjustment arrangement provided by the present invention is convenient for the user to operate. In chop saw mode, it is usual for the pivot member to be at the back of the saw leaving the "mouth" of the saw (ie the gap between the saw assembly and the table) facing the front. However, if the saw is flipped-over to bench saw mode, the pivot member is now at the front of the saw, under the table. The adjustment means is thus easily accessible to the user at the front of the saw. However, besides access, it is desirable to have a knob or handle which, with only a few turns, effects the adjustment between minimum and maximum depth of cut.

However, if the weight of the saw and the effect of the spring biasing means (in its most tensioned position) must be accommodated, this usually means that a fine, that is to say highly geared, form of adjustment must be employed because a coarse form will (in one direction) be difficult to operate, because the saw assembly must be raised against its own weight and the pressure of the spring biassing, and may be precipitous in the other direction.

Thus the invention provides a further refinement in that the saw has spring means between the pivot member and saw assembly to bias the saw assembly away from the table, and wherein the spring means acts on an intermediate element disposed between the pivot member and saw assembly, the intermediate element having two dispositions, in a first of which dispositions said spring means supports the weight of said saw assembly when the table in its first position and in a second of which dispositions said bias is substantially removed.

Thus in the bench saw mode of use of the saw according to the present invention, the additional effect of the spring means on the depth of cut adjustment is removed so that a coarser form of adjustment may be employed than would otherwise be possible.

Said intermediate element may comprise a toggle lever pivoted to the pivot member which in said first disposition tensions said spring means and, in pivoting to said second disposition, releases said tension and pivots said carrier into engagement with said extension.

Said carrier and toggle lever may be pivoted about the same axis in said pivot member.

Said spring means may comprise a torsion spring around the pivot axis of the saw assembly in the pivot member, one end of said spring pressing against the saw assembly and the other end engaging said toggle lever. An intermediate lever may be disposed between said other end and said toggle lever.

DESCRIPTION OF THE DRAWINGS

The invention is further described hereinafter, by way of example only, with reference to the accompanying drawings, in which:

FIGS. 4a and b are views in the direction of arrow IV in FIG. 3b;

FIGS. 5a and b are sections along the lines A—A and B—B in FIGS. 4a and 4b respectively; and, FIG. 6 is a sectional view on the line VI—VI in FIG. 1a

DETAILED DESCRIPTION OF THE INVENTION

Figure 1A:
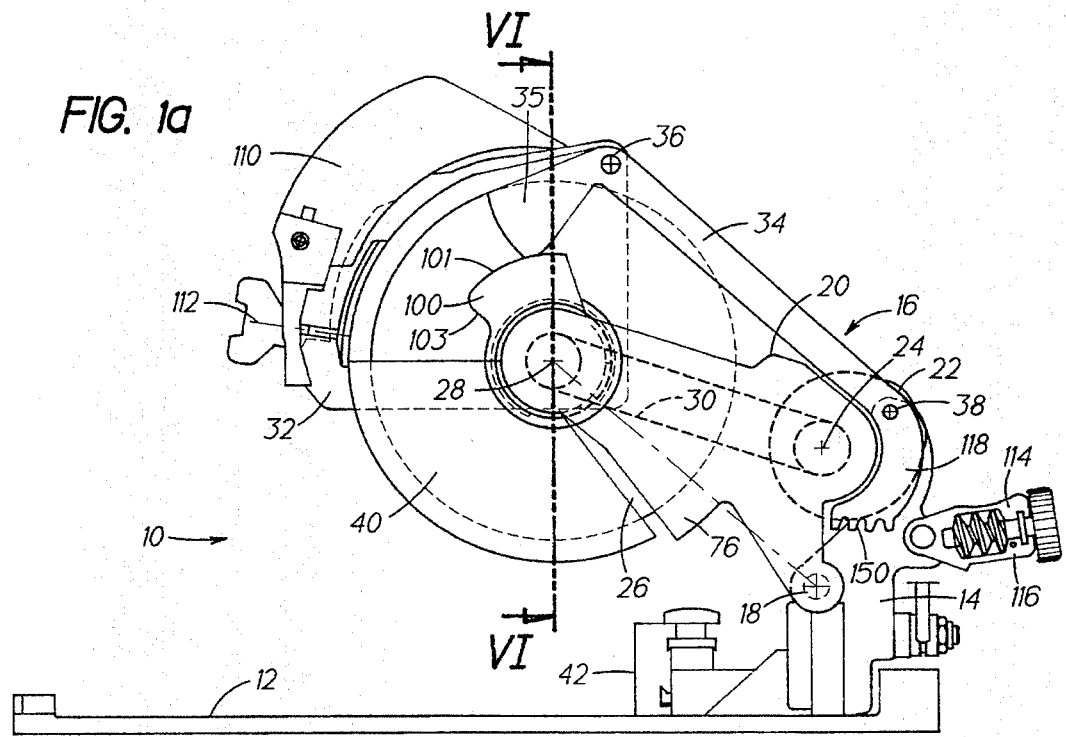
FIGS. 1a to d are side views in different positions of a saw according to the present invention in chop saw mode.
Figure 1B:
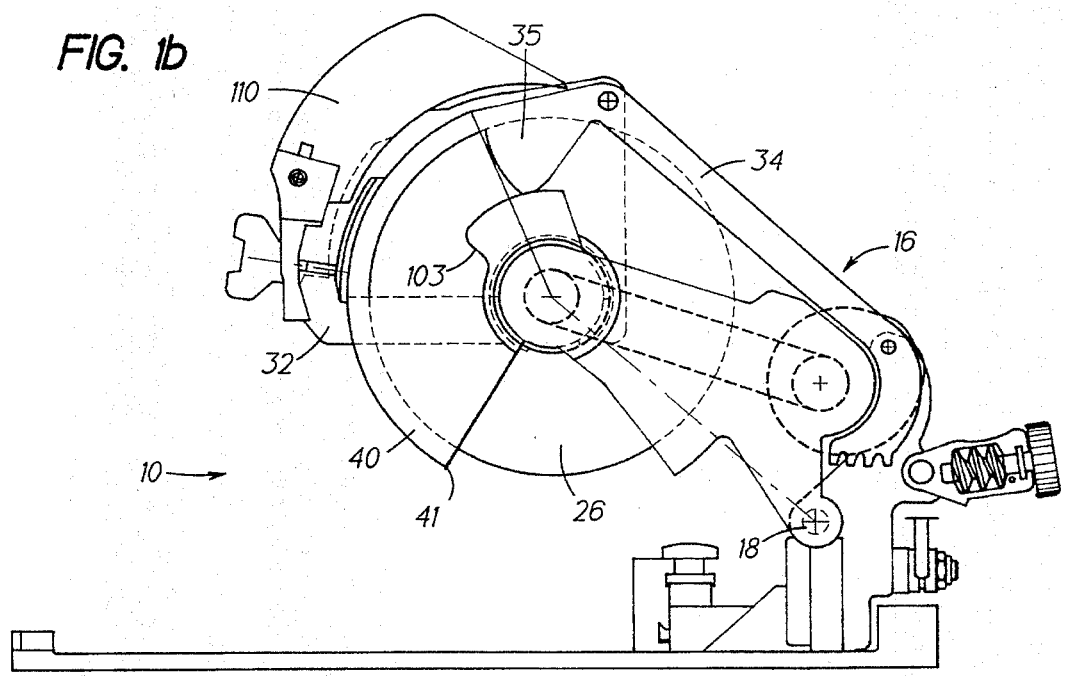

Referring first to FIG. 1a, a saw 10 according to the invention comprises a table 12 having a pivot member 14 to which a saw assembly 16 is pivoted about axis 18.

The saw assembly 16 comprises a housing 20 mounting a motor 22 having a rotation axis 24. The motor 22 drives a circular saw blade 26 mounted in the housing 20 about axis 28 through a belt 30 drive connection.

An upper guard 32 is pivotally mounted in the housing 20 about axis 28. It is connected to the pivot member 14 by parallelogram lever 34 pivoted at both ends about axes 36, 38. Lines joining axes 36, 38 and 18, 28 are parallel.

A lower guard 40 is likewise pivotally mounted in the housing 20 about axis 28. It is opened by means of an actuator lever (not shown) to expose the blade 26. When this is done, the assembly 16 is capable of pivoting down about axis 18 to plunge the blade 26 into a workpiece (not shown) supported on the table 12 against a fence 42. The table 12 has a slot (not shown) through which the blade passes as the assembly pivots down to the position shown in FIG. 1d.

The parallelogram lever 34 maintains the orientation of the upper guard 32 with respect to the pivot member 14 and hence the table 12.

In FIGS. 1a to d the saw 10 is shown in four positions in which the lower guard 40 is in four different positions.

The parallelogram lever 34 has an extension 35 which abuts top surface 101 of a flange 100 of the guard 40. Analysis of the geometry of the arrangement demonstrates that saw assembly 16 cannot pivot downwards from the position shown in FIG. 1a about axis 18 while extension 35 abuts flange 100. This forms a lock which is released by opening the guard 40 by said actuator lever to the position shown in FIG. 1b. Here the flange 100 has moved out from underneath the extension 35 and so the assembly is now permitted to pivot about axis 18.

Figure 1C:
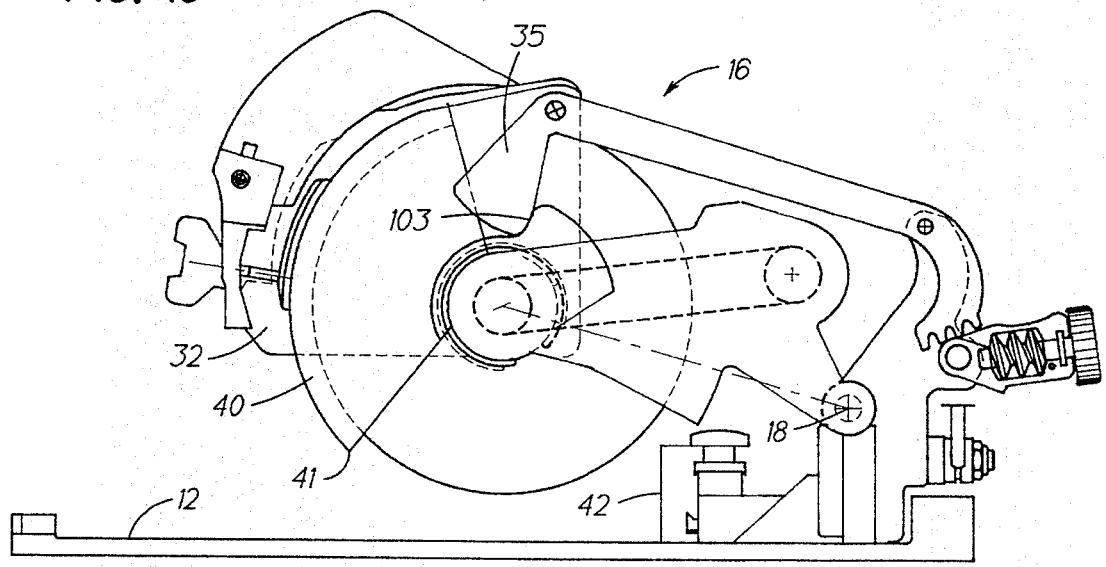
Figure 1D:
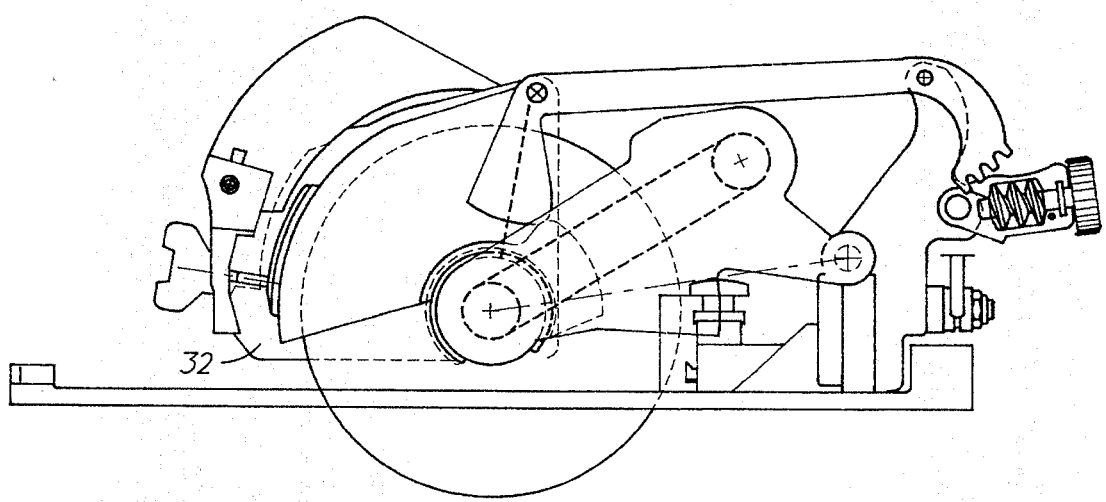

In FIG. 1c, the assembly 16 is pivoted down about axis 18 to cut workpieces positioned on the table 12 against fence 42. Between the positions in FIGS. 1b and c, the extension 35 engages a cam surface 103 of the flange 100 so that downward movement of the assembly 16 opens further the guard 40. In FIG. 1d, the guard is fully withdrawn inside the upper guard 32.

The saw 10 so far described is a chop saw, but table 12 is preferably mounted in a frame enabling it to be inverted. A suitable mechanism for this arrangement is described in British patent application No. 9218363, although either of the arrangements shown in EP 0502350 or DE 1628992 will suffice.

Figure 2A:
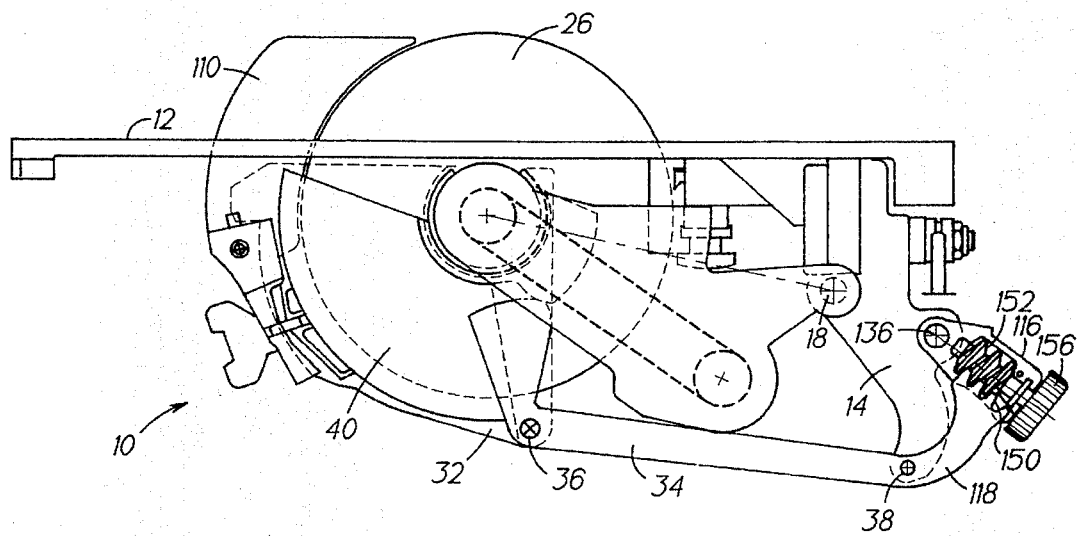
FIGS. 2a and b are side views in two different positions of the saw of FIG. 1 in bench saw mode.

In FIGS. 2a and b the saw 10 is shown inverted for use as a bench saw in which the blade 26 protrudes through the slot (not shown) in the table 12.

Figure 2B:
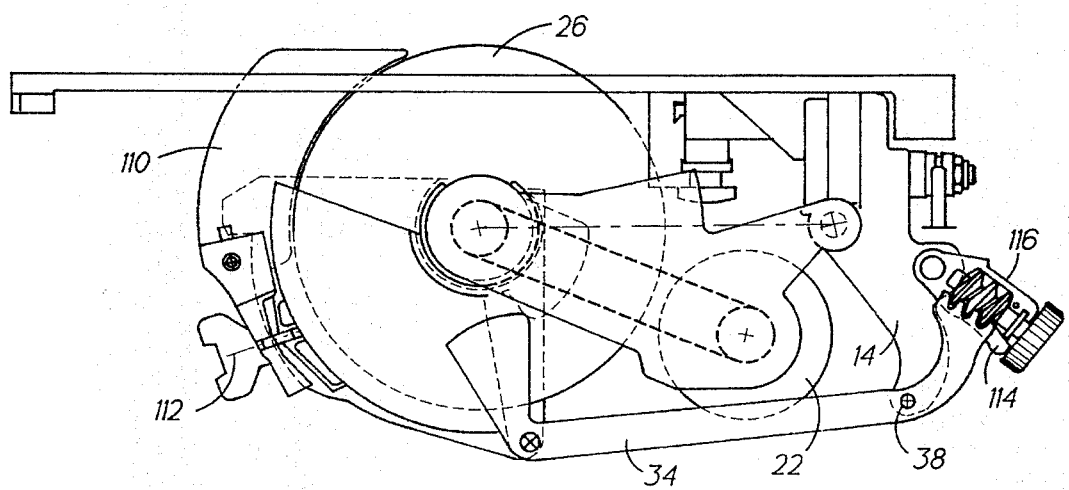

Before the table is flipped over, two features are brought into effect. In the FIG. 1a position, a riving knife 110 is rotated about an axis 112 through 180°. This brings it to its effective position for rip-sawing in the bench saw mode shown in FIG. 2. Obviously the knife cannot be rotated about axis 112 when in this position. Secondly, when in the FIG. 1a position, a spring release toggle lever 114 is actuated as described further below to release spring pressure urging the saw assembly towards the FIG. 1a rest position of the saw and simultaneously bring worm gear carrier 116 also described further below into engagement with another extension 118 of the parallelogram lever 34. This serves to lock the saw assembly in the position shown in FIGS. 2a and b so that it can be flipped over to that orientation.

Figure 3B:
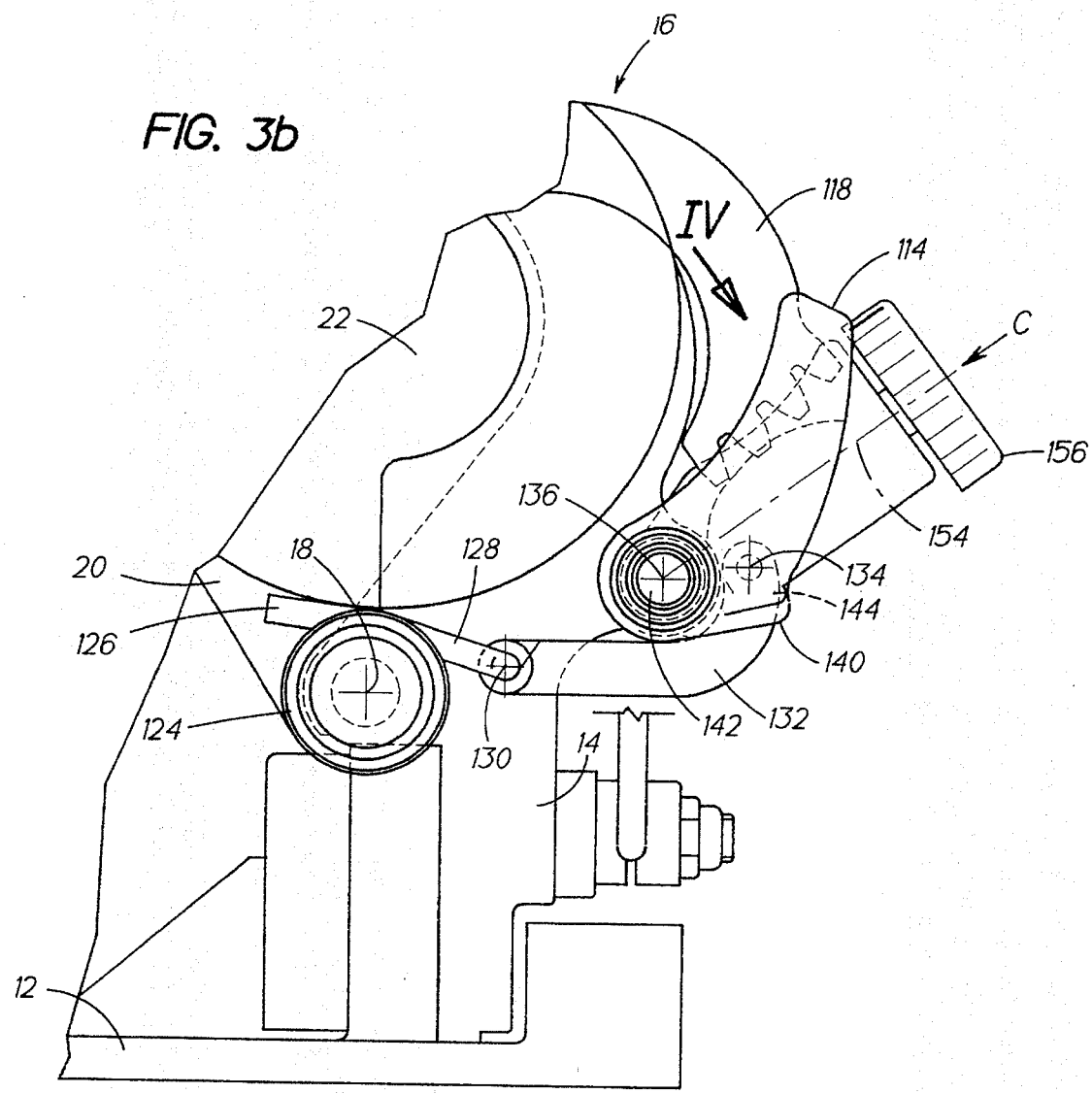
FIGS. 3a and b are side views of a spring release device according to the present invention in first and second dispositions thereof respectively.
FIG. 3c is a view in the direction of arrow C in FIG. 3b.
Figure 3C:
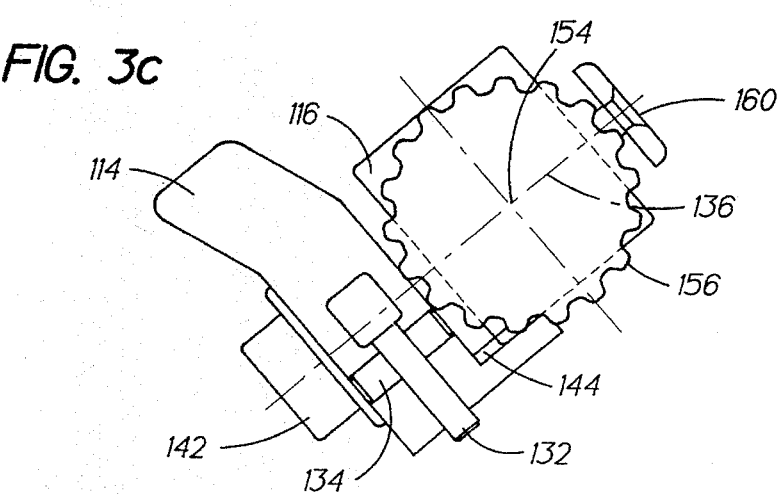
Figure 6:
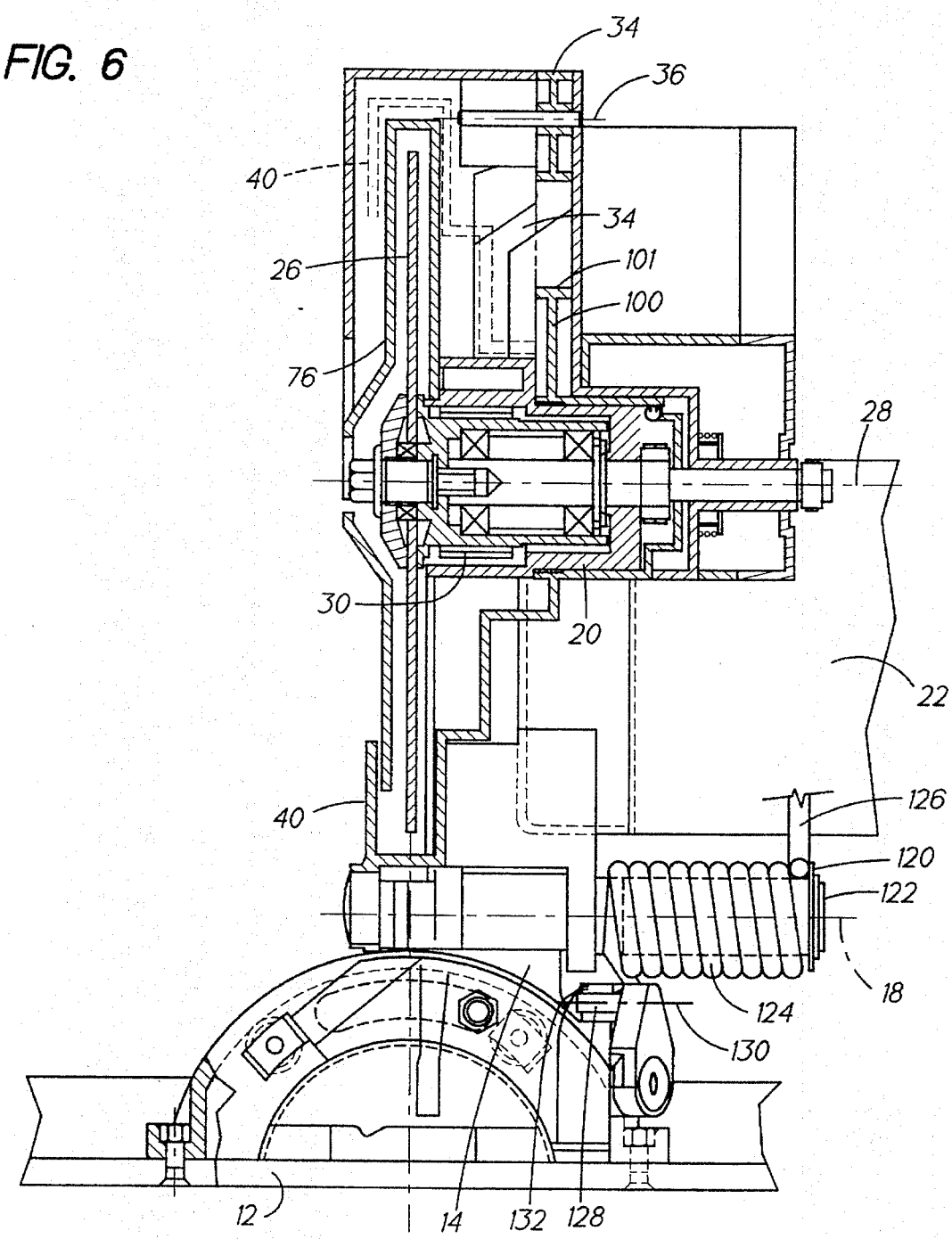

Referring now to FIGS. 3a to c, the housing 20 of the saw assembly 16 has a sleeve 120 rotatably journalled on axle 122 of pivot member 14 to form pivot axis 18. Around the sleeve 120 is wound a torsion spring 124, one end 126 of which abuts the housing of motor 22 connected to the housing 20 of the saw assembly 16.

The other end 128 of the spring is pivoted about axis 130 to intermediate lever 132. The other end of lever 132 is pivoted to toggle lever 114 about axis 134. Toggle lever 114 is pivoted to the pivot member 14 about axis 136. The lever is shown in FIG. 3a in its first disposition, in which it is placed when the saw 10 is used as a chop saw as shown in FIGS. 1a to d. Here, the lever is rotated clockwise to its maximum extent whereupon a heel 140 thereof abuts the motor housing 22. The spring 124 is in this position sufficiently tensioned so that its end 126 can support the weight of the saw assembly 16.

On pressing knob 142 (see FIG. 3c) described further below, the toggle lever 114 can be rotated anti-clockwise, progressively relieving the tension of the spring 124. It is advisable during this manoeuvre for the user to take the weight of the saw assembly and let it drop slowly into the table 12. In its second disposition shown in FIG. 3b, a leg 144 of the toggle lever 114 has abutted a heel 146 of the worm gear carrier 116 and brought it into engagement with a rack 150 formed on the end of extension 118 of the parallelogram lever 34. The rack 150 comes into engagement with the carrier when the saw assembly drops near the table 12 and just before the blade 26 penetrates the slot in the table.

Turning to FIGS. 4a and b, the worm gear carrier 116 carries a worm gear 152 which is rotatable in the carrier about a longitudinal axis 154 by a knob 156 formed on one end of the gear. When engaged with the rack 150, as shown in FIG. 3b, turning of the knob 156 rotates the gear 152 and moves the rack 150 substantially in the direction of axis 154 and pivots the parallelogram lever about its axis 38 with respect to the pivot member 14 and in so doing raises and lowers the saw assembly 16 with respect to the table 12. Because the tension of the spring 124 has been released, only the weight of the saw assembly 16 need be supported by the worm gear 152. Accordingly, this gear can have a relatively coarse thread so that only a few turns of the knob 156 is required to effect adjustment of the depth of cut of the blade 26 protruding through the table 12 between the positions shown in FIGS. 2a and b. If, however, the spring 124 was still fully tensioned, then this would more than double the load on the worm gear, and on indeed the lever 34, 118, and such a coarse thread would not be practical.

To move the toggle lever 114 between its two positions necessitates the release of a lock. If a lock was not provided, inadvertent release of the lever from its position shown in FIG. 3a could have disastrous consequences. Any form of lock will suffice, but FIGS. 4 and 5 show one suitable embodiment.

Axis 136 is formed by an axle 158 secured to the pivot member 14 by screw 160. Carrier 116 freely pivots on the axle. A shoulder 164 of the axle retains a collar 166 of the toggle lever 114 on the axle. A bore 168 of the toggle lever receives the knob 142 referred to above. The knob has four splines 170 which engage corresponding slots in the bore 168 so that the knob is constrained to rotate with the lever 114 about axle 158. However, the axle is itself provided with a short splined section 162 and a bore 172 of the knob is likewise provided with a corresponding splined section 174.

The knob is biassed by a spring 176 to the position shown in FIG. 4a, and in which position the splined sections 162, 174 of the axle 158 and knob 142 respectively coincide (see FIG. 5a). Thus the lever 114 is rotationally locked on the axle 158. If the knob 142 is depressed, however, compressing the spring 176, the splines 162,174 are disengaged and the lever 114 can be turned (see FIGS. 4b and 5b).

Finally, returning to FIGS. 3a and b, the spring 124 is arranged to be twisted so that its ends are at about 90° to each other in the raised, at-rest position. A further 45° or more may be added during pivoting to the FIG. 1d position. The spring force acts between the axes 130 and 134, which can be seen to tend to turn the lever 114 clockwise. In this position, heel 140 abuts the motor 22 and in any event, the line of axes 130,134 is so close to the axis 136 that the torque on the lever 114 is quite small, even at maximum spring compression.

On the other hand, the spring is arranged in the FIG. 3b position to be completely free so that there is no residual torque on the lever 114. Moreover, when the lever 114 is again operated from the FIG. 3b position to tension the spring 124, the line of axes 134, 130 again serves to turn spring end 128 clockwise about axis 18. Although only a small torque can initially be applied (because that line is close to axis 18) the spring is free ad offers only little resistance.

I claim:

1. A saw comprising a frame, a table mounted in the frame and adapted to adopt two positions, a pivot member on a first side of the table, a saw assembly pivoted with respect to the pivot member, a blade journalled in said assembly, a motor to drive the blade, an upper guard to cover an upper portion of the blade, which upper guard is pivoted to said assembly, a slot in the table through which said blade is adapted to protrude, in a first of said two positions of the table the saw assembly being above the table, the saw thereby forming a chop saw for performing plunge cuts on workpieces supported on said first side of the table, and, in a second of said two positions of the table, the saw assembly being below the table and the saw thereby forming a bench saw for performing cuts on workpieces passed through the blade on a second opposite side of the table, a parallelogram lever having a pivotal connection to the pivot member and upper guard whereby an orientation of said upper guard with respect to said pivot member is maintained, and an extension of said parallelogram lever which, when the saw assembly is in its second position, is adapted to co-operate with said pivot member through an adjustment means so that the position of said saw assembly with respect to the table is controlled by said adjustment means.

2. A saw as claimed in claim 1, in which said adjustment means comprises a worm gear rotationally mounted in a carrier member, which carrier member is adjustably connected to said pivot member, and said extension has a rack to engage said worm gear, rotation of the worm gear when engaged with said rack serving to pivot said parallelogram lever about its pivot to the pivot member to alter a height of protrusion of the blade through the slot.

3. A saw as claimed in claim 2, in which spring means are provided between the pivot member and saw assembly to bias the saw assembly away from the table, and wherein the spring means acts on an intermediate element disposed between the pivot member and saw assembly, the intermediate element having two dispositions, in a first of which dispositions said spring means supports the weight of said saw assembly when the table is in its first position and in a second of which dispositions said bias is substantially removed.

4. A saw as claimed in claim 3, in which said carrier member is pivoted to said pivot member and said intermediate element comprises a toggle lever pivoted to the pivot member, which toggle lever in said first disposition tensions said spring means and, in pivoting to said second disposition, releases said tension and pivots said carrier into engagement with said extension.

5. A saw as claimed in claim 4, in which said carrier and toggle lever are pivoted about the same axis in said pivot member.

6. A saw as claimed in claim 5, in which said spring means comprises a torsion spring around the pivot axis of the saw assembly in the pivot member, one end of said spring pressing against the saw assembly and the other end engaging said toggle lever.

7. A saw as claimed in claim 6, in which an intermediate lever is disposed between said other end of the spring and said toggle lever.

8. A saw as claimed in claim 7, in which said other end of the spring is pivoted to said intermediate lever about a first axis, said intermediate lever is pivoted to said intermediate element about a second axis and said intermediate element is pivoted to said pivot member about a third axis, said axes being parallel with a line joining said first and second axes lying to one side of said third axis in said first disposition of said spring and to the other side of said third axis in said second disposition.

9. A saw as claimed in claim 8, in which said spring means is neutral in said second disposition.

10. A saw as claimed in claim 4, in which said spring means comprises a torsion spring around the pivot axis of the saw assembly in the pivot member, one end of said spring pressing against the saw assembly and the other end engaging said toggle lever.

11. A saw as claimed in claim 1, in which spring means are provided between the pivot member and saw assembly to bias the saw assembly away from the table, and wherein the spring means acts on an intermediate element disposed between the pivot member and saw assembly, the intermediate element having two dispositions, in a first of which dispositions said spring means supports the weight of said saw assembly when the table is in its first position and in a second of which dispositions said bias is substantially removed.

\* \* \* \* \*